United States Patent [19]

Heinrich et al.

[11] Patent Number: 4,812,272

[45] Date of Patent: Mar. 14, 1989

[54] PROCESS BY COMPACTING A POROUS STRUCTURAL MEMBER FOR HOT ISOSTATIC PRESSING

[75] Inventors: Jurgen Heinrich, Bonn; Manfred Bohmer, Lohmar, both of Fed. Rep. of Germany

[73] Assignee: Duetsche Forchungs- und Versuchsanstalt fur Luft- und Raumfahrt e.V., Cologne, Fed. Rep. of Germany

[21] Appl. No.: 11,446

[22] Filed: Feb. 5, 1987

Related U.S. Application Data

[63] Continuation of Ser. No. 696,916, Jan. 31, 1985, abandoned.

[30] Foreign Application Priority Data

Feb. 4, 1984 [DE] Fed. Rep. of Germany ....... 3403917

[51] Int. Cl.[4] ............................................. C04B 35/64
[52] U.S. Cl. ........................................ 264/65; 264/56; 264/62; 264/332
[58] Field of Search ....................... 264/43, 62, 65, 66, 264/125, 325, 332; 425/405 H

[56] References Cited

U.S. PATENT DOCUMENTS

| | | | |
|---|---|---|---|
| 4,112,143 | 9/1978 | Alderborn et al. | 427/191 |
| 4,264,546 | 4/1981 | Becker | 264/65 |
| 4,310,477 | 1/1982 | Uy et al. | 264/62 |
| 4,356,136 | 10/1982 | Mangels | 264/65 |
| 4,381,931 | 5/1983 | Hunold et al. | 65/18.1 |

FOREIGN PATENT DOCUMENTS 3047237 6/1982 Fed. Rep. of Germany .

*Primary Examiner*—Jan H. Silbaugh
*Assistant Examiner*—Mary Lynn Fertig
*Attorney, Agent, or Firm*—Morgan & Finnegan

[57] ABSTRACT

A process for compacting a porous ceramic structural member having a complicated shape and an optional size by encapsulation with material of the same type and capable of sintering and subsequently subjected to hot-isostatic pressing; immersing the preformed body in a suspension of a material of the same type in a solvent but which contains no sintering aid and forming a first encapsulating layer; evaporating the solvent; immersing the thus obtained body in a second suspension of a material in a solvent of the same type capable of sintering and which contains one or more sintering aids, and forming a second encapsulating layer; evaporating the solvent; subjecting the thus obtained body at an elevated temperature in an atmosphere of a protective gas for a sufficient period of time to sinter the same; isostatically compacting the body provided with a tight-sintered surface; and mechanically removing the encapsulating layers.

25 Claims, 1 Drawing Sheet

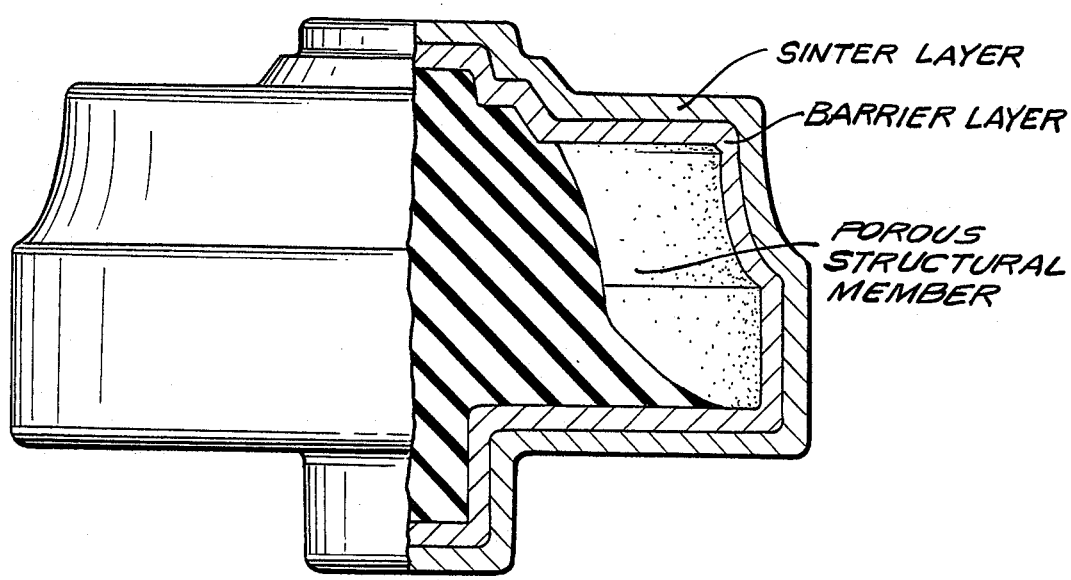

PROCESS BY COMPACTING A POROUS STRUCTURAL MEMBER FOR HOT ISOSTATIC PRESSING

This is a continuation of co-pending application Ser. No. 696,916, filed on Jan. 31, 1985, now abandoned.

BACKGROUND OF THE INVENTION

The invention relates to a process for a compacting porous structural member having a complicated shape and an optional size by encapsulation of the member with a material of the same type and which is capable of sintering, and subsequently subjecting the encapsulated member to hot-isostatic pressing.

Molded articles made of ceramic non-oxidic materials such as, for example, silicon nitride, silicon carbide, boron nitride or boron carbide have continued to come into wider use. Such molded articles or structural members are very porous and, thus, require treatment to reduce their porosity.

A known process for reducing the porosity of such molded articles, for example, involves hot-isostatic molding or hot-isostatic pressing. Since a gas is used in this process as the medium for transferring pressure, the porous ceramic bodies have to be encapsulated by a gas-tight capsule prior to compacting the same. Because of the high compacting temperatures of silicon nitride, silicon carbide, boron nitride and boron carbide from which such molded articles are usually made, glasses having high softening temperatures such as, for example, fused silica Vycor$^{(R)}$* or Duran$^{(R)}$** glass are almost exclusively employed as capsule materials.
*Reg. TM, Corning Glass Works, Corning, NY, USA
**Reg. TM, Jenaer Glaswerk Schott & Gen, Mainz, West Germany However, various crucial disadvantages are inherent in the use of a glass as the capsule material. For example, reactions will occur between the glass envelope and the ceramic molded articles at the high compacting temperatures employed which are in excess of 1600° C. In addition, the above-mentioned glasses all have very much smaller coefficients of thermal expansion than th ceramic molded articles. Consequently, upon cooling very high stresses occur which may result in complete destruction of the molded articles or structural members. Still further, great difficulties are involved in removing the glass capsule envelope from such molded articles after hot-isostatic molding.

In German Offenlegungsschrift No. DE-OS 30 47 237 there is described a process which avoids such drawbacks. The described process, porous bodies made of a ceramic material and having a complicated shape, such as, for example, turbine blades, are encompassed or coated with an inert pressing powder such as, for example, boron nitride powder, and then melt-encapsulated in quartz glass capsules prior to being subjected to hot-isostatic molding. The boron nitride powder prevents the capsule material from reacting with the material of the structural member so that upon cooling, no stresses will occur and after hot-isostatic pressing the capsule can be readily removed. The described process is well suited for manufacturing turbine blades.

However, when larger structural members such as, for example, turbo-supercharger rotors or monolithic turbine wheels are to be compacted, the glass capsules have to be more voluminous. In such cases, however, they become so expensive that economical manufacture of such structural members is no longer possible.

In the DE-OS No. 28 12 986, there is described a process in which a structural member made of silicon nitride, which contains a compacting aid, is employed. The porous article is coated with a silicon nitride skin having a thickness from 25 to 250 μm. In a subsequent heating step, part of the compacting aid is supposed to diffuse from the molded article into the silicon nitride skin. It is intended thereby to cause the silicon nitride layer to be compacted by undergoing a further temperature treatment so that it can be subjected to a high pressure atmosphere without cracking. Several crucial drawbacks are inherent in this process. It is known from the literature (e.g., G. Wotting, Dissertation, Technical University, Berlin, 1983, page 9; Sallmang and Scholze, Die physikalischen und chemischen Grundlagen der Keramik, Springer-Vergag, Berlin, 1968) that the diffusion rates in silicon nitride and also in silicon carbide, boron nitride and boron carbide, are extremely low due to the high proportion of covalent bonding of these materials. It follows therefrom that the diffusion from the interior of the structural member to the outside thereof of the compacting aid in an amount sufficiently high so that the external skin will become tight-sealed by sintering which may take several hundred hours. Another drawback resides in the fact that the article to be compacted must itself contain a high proportion of the compacting aid. However, the compacting aids adversely affect the high-temperature properties of the respective materials, while it is precisely these high-temperature properties of silicon nitride, silicon carbide, boron nitride and boron carbide containing no compacting aid that render these materials so attractive for making high precision structural members. Another disadvantage resides in the fact that the silicon nitride skin, as applied, will become an integral component of the finished article. However, in the manufacture of high precision structural members, the requirements as to homogeneity of the silicon metal slip, accuracy of the casting procedure, maintenance of the conditions in the nitrideforming step and diffusion of the compacting aid are very difficult to achieve in the described process of DE-OS No. 28 12 986. Thus, molded articles having varying dimensions will be obtained.

There exists, therefore, a need to provide a process for encapsulating porous molded articles having complicated shapes and optional sizes, wherein the articles or structural members do not have to contain compacting aids, the coefficients of thermal expansion of molded articles and of the capsule materials are compatible with each other, and in which no reactions can occur between the capsule materials and the material of the structural members. The present invention fulfills this need.

BRIEF STATEMENT OF THE INVENTION

According to the present invention, there is provided a process for compacting a porous ceramic structural member having a complicated shape and an optional size by encapsulation of the member with material being of the same type and which is capable of being sintered and subsequently subjected to hot-isostatic pressing, comprising the steps of:

(a) immersing a preformed porous ceramic body in a suspension of a material of the same type in a solvent and which contains no sintering aid, and forming a first encapsulating layer on the body;

(b) evaporating the solvent;

(c) immersing the thus obtained body in a second suspension of a material of the same type in a solvent and which is capable of being sintered and which contains at least one sintering aid, and forming a second encapsulating layer on the body;
(d) evaporating the solvent;
(e) subjecting the thus obtained body to an elevated temperature in an atmosphere of a protective gas for a sufficient period of time to sinter the body substantially completely;
(f) isostatically compacting the body provided with a tight-sintered surface; and
(g) mechanically removing the two encapsulating layers.

THE DRAWINGS

In order to understand the process of this invention more completely, reference is directed to the accompanying drawing wherein in the sole FIGURE there is schematically illustrated a porous structural member encapsulated in a first barrier layer.

DESCRIPTION OF THE PREFERRED EMBODIMENTS

The initially porous molded articles employed in the process of this invention and which are encapsulated and subsequently hot-isostatically molded in accordance with the process consist of a non-oxidic ceramic material such as, but not limited to, for example, silicon nitride, silicon carbide, boron nitride and boron carbide. A particularly preferred material from which the molded articles can be made is silicon nitride, $Si_3N_4$.

In accordance with the invention, it is irrelevant how the porous molded articles themselves are produced. Preformed structural members obtained by injection molding, slip casting or any other method, or by reaction-sintering, made of materials of the type above-mentioned may be used in carrying out the inventive process. The materials preferably contain no compacting aid, or only up to 4% by weight of a compacting aid.

In order to form the first encapsulating layer, the porous molded bodies are immersed in a suspension in a solvent of a material of the same type as the porous molded bodies and which contains no sintering aid. It is to be understood that the term "material of the same type" as used herein refers to those materials which will not undergo a chemical reaction with the material of the structural member, will not give rise to mechanical indenting, that is, "toothing", between the structural member and the first encapsulating layer and have substantially the same coefficient of thermal expansion as the material of the structural member.

It is preferred that for the formation of the first encapsulating layer the same material is used as that of which the porous ceramic article consists, although it is to be understood that the process is operative to produce satisfactory products where the material of the first encapsulating layer is different from that of the molded article, so long as the material is a non-oxidic ceramic material such as those mentioned above. Thus, for example, molded articles made of silicon nitride are preferably provided with a first capsule-forming layer of silicon nitride, while molded articles made of silicon carbide are preferably provided with a first capsule-forming layer of silicon carbide etc.

The suspensions in which the porous ceramic molded articles are immersed are prepared by suspending the respective material to be used for the first encapsulating layer in powdery form in a suitable solvent. These suspensions contain powder and solvent in a composition ratio of from about 30:70% by weight to about 70:30% by weight, and preferably in a composition ratio of about 50:50% by weight.

As solvent, all solvents are basically suitable which, due to their relatively high vapor pressures, can be readily removed by drying. Preferred solvents for such use are organic solvents such as, for example, isopropanol.

Due to the suction effect caused by the porous molded article upon its immersion in the powder suspension, a powder layer of the material of the same type about 1 mm in thickness is formed on the surface of the molded body. Then, the solvent is removed in a drying step. Drying may be effected in a drying chamber, for example, at 110° C. Other drying procedures are also usable, for example, drying in a stream of hot air, or allowing the molded article coated with the first encapsulating layer to be exposed to air at room temperature for a sufficient perior of time to complete drying.

In one preferred embodiment of the present invention, a powder of a material of the same type which also does not contain any sintering aid and is distinguished from the powder as suspended in the employed solvent only by its particle size additionally may be dusted onto the first encapsulating layer while it still contains solvent. The powder component applied by dusting remains adhered on the still wet first encapsulating layer, absorbs solvent and, due to its enlarged surface, contributes to a more rapid evaporation of the solvent at a low temperature.

In accordance with the next process step of the inventive process, the thus obtained molded body coated with a first encapsulating layer is immersed in a second suspension of a material of the same type capable of sintering in a solvent but which contains at least one, and may contain more than one, sintering aid whereby a second encapsulating layer is formed. It is to be understood that the term "material of the same type" as used in the context of the present invention, as in the case of the first encapsulating layer, refers to ceramic non-oxidic materials which will not undergo a chemical reaction with the material of the structural member, will not give rise to mechanical indenting, that is, "toothing", between the different layers and substantially have no different coefficients of thermal expansion from that of the material of the structural member. Examples for such materials are silicon nitride silicon carbide, boron nitride and boron carbide.

It is preferred that for the second encapsulating layer the same material be used as that material of which the molded body and the first encapsulating layer also consist. Again, particularly preferred as a material for the second encapsulating layer is silicon nitride.

The suspensions for applying the second encapsulating layer have a solids content of from about 30 to about 70% by weight, and preferably of about 50% by weight, the balance of the suspensions comprising the solvent. The solvents to be employed are again those which are readily volatile due to their high vapor pressures. Preferred are again organic solvents, such as, for example, isopropanol.

The solid proportion for the application of the second encapsulating layer consists of from about 50 to about 99% of the powdery material of the same type and which is capable of sintering and from about 1 to about 50% of one or more than one sintering additive.

The type and amount of the sintering additive or additives in the composition of the solid proportion of the powder suspensions may vary widely and are dependent upon the type of material employed to form the second encapsulating layer. Thus, for example, when silicon nitride is used as the material to form the second encapsulating layer, from about 5 to about 15% by weight of MgO and from about 2 to about 10% by weight of $Al_2O_3$, or from about 5 to about 15% by weight of $Y_2O_3$ and from about 2 to about 10% by weight of $Al_2O_3$, or from about 5 to about 15% by weight of $Ce_2O_3$ and from about 2 to about 10% by weight of $Al_2O_3$ are added, the percentages being based on the amount of the respective compound in the solid proportion of the suspension. The solid proportion of silicon carbide suspensions contains from about 1 to about 5% by weight of carbon and from about 1 to about 5% by weight of boron or aluminum or beryllium or compounds thereof, respectively. Boron nitride suspensions, in their solid proportion, contain from about 10 to about 20% by weight of $B_2O_3$ together with about 2 to about 7% by weight of Al or about 2 to about 7% byweight of AlN or about 1 to about 3% by weight of Ca. Boron carbide suspensions, in their solid proportion, contain from about 10 to about 50% by weight of Al or Ti or Si.

The suspensions of the second encapsulating layer are applied onto the molded bodies in the same manner as those of the first encapsulating layer and the coating step is followed by the respective step of drying the second layer.

Depending on the total porosity of the molded body to be compacted and the pore size of its constituent material, the step of immersing the molded body in the second suspension containing one or several sintering aids and the subsequent evaporation of the solvent is repeated once or several times. When the pore size of the molded body is small, repetition is not required and the second encapsulating layer is applied only once. On the other hand, as the pore size increases, the number of layers containing the sintering aid or aids to be applied will also be increased. However, taking into consideration material consumption and the expense of additional respectively necessary drying steps, the number of layers containing the sintering aid or aids to be applied is generally kept as low as possible, and its preferred to apply only one second encapsulating layer.

In another preferred embodiment of the present invention, drying of the second encapsulating layer is carried out directly in a suitable pressure oven in which the subsequent step of sintering and the hot-isostatic molding are also performed. In such cases, for effecting the drying step, a slight vacuum (1.33 Pa) may be employed.

The molded articles obtained as described above are sintered in a subsequent process step in an atmosphere of a protective gas at an elevated temperature. As protective gases nitrogen and argon are generally exclusively used.

The sintering temperature may vary widely and are dependent upon the kind of material employed for the second encapsulating layer. In general, the sintering temperatures are in a range of from about 1700° C. to about 2300° C., being from about 1700° C. to about 2000° C. in the case of silicon nitride, from about 1900° C. to about 2200° C. in the case of silicon carbide, from about 1750° C. to about 2100° C. in the case of boron nitride and from about 2000° C. to about 2300° C. in the case of boron carbide.

The periods of time during which the coated molded articles are to be maintained at the indicated temperatures in general are relatively short. They are on the order of about 10 minutes. Under the process conditions mentioned, the outermost encapsulating layer containing one or several sintering aids will sinter to become tight. In the course thereof, the first encapsulating layer will prevent reactions from occurring between the structural element or member and the gas-tight second capsule layer which is to receive and transfer the pressure in the subsequent process step. In order to save energy for heating the oven, and time as well, the dense-sintering step of the second encapsulating layer is preferably carried out in a pressure oven and in which the molded article coated with the two encapsulating layers is compacted by hot-isostatic pressing. In this case, in the beginning of the hot-isostatic compaction step, only the gas pressure is elevated, and the temperature is adjusted to the value at which the hot-isostatic molding is to be carried out.

The temperatures and pressures employed to achieve the hot-isostatic pressing in accordance with the process of this invention are also dependent on the materials from which the molded body and the capsule layers, respectively, are made. Such pressures and temperatures may vary widely, the pressures generally being in a range of from about 10 MPa or less to about 300 MPa and the temperatures generally being in the range of from about 1600° C. to about 2300° C. More specifically, hot-isostatic pressing is carried out under a pressure of from about 30 to about 300 MPa and at a temperature of from about 1600° C. to about 2000° C. in the case of silicon nitride, under a pressure of from about 30 to about 300 MPa and at a temperature of from about 1800° C. to about 2200° C. in the case of silicon carbide, under a pressure of from about 10 to about 300 MPa and at a temperature of from about 1700° C. to about 2100° C. in the case of boron nitride and under a pressure of from about 10 to about 300 MPa and at from about 1900° C. to about 2300° C. in the case of boron carbide.

Argon is a preferred gas for use as the pressure-transferring gas in the compacting step.

In the last step of the process according to the present invention the two capsule layers are mechanically removed in any conveniently suitable manner. This is already effected partially due to the fact that parts of the capsules will chip off as the compacted molded body cools. The remaining capsule fragments are generally removed by sand-blasting.

The process according to the invention produces compacted molded articles having excellent properties and exactly predetermined dimensions. It is a particular advantage of the process according to the invention that it is applicable with ease to the manufacture of members having a simple structure, as well as to the manufacture of molded articles having a complicated shape and varying dimensions. The process is not impaired by any restrictions imposed by the dimensions of the molded articles or by the complexity of the shapes thereof.

THE EXAMPLES

The present invention is illustrated in greater detail by the following non-limiting examples. The Examples are in parts and percents and by weight unless otherwise stated.

EXAMPLE 1

The starting material to be compacted comprised turbine blades made of porous reaction-sintered silicon nitride containing from 4% to 0%, by weight, as a compacting aid, that is, a sintering aid, yttrium oxide. The total porosity thereof was about 20%. To apply the first encapsulating layer, the structural members were immersed in a suspension comprising 50%, by weight, of silicon nitride powder and 50%, by weight, of isopropyl alcohol. The silicon nitride powder of the suspension did not contain any sintering aid. Due to the suction effect caused by the porous molded articles upon immersion in the powder suspension, a silicon nitride powder layer about 1 mm in thickness was formed on the surfaces of the molded bodies. Then, the alcohol was removed therefrom by heating the bodies at 110° C. in a drying chamber.

Then the structural members coated with the first layer were immersed in a second suspension, the solids proportion of which comprised 80%, by weight, of silicon nitride, 15%, by weight, of yttrium oxide and 5%, by weight, of aluminum oxide. Due to the suction effect caused by the porous molded articles upon immersion in the powder suspension, a second layer containing a compacting aid was formed on the first layer consisting of pure silicon nitride. The alcohol again was removed therefrom by heating the bodies at 110° C. in a drying chamber.

To prepare a gas-tight outer layer, the structural members were then sintered at 1820° C. under a nitrogen atmosphere for 10 minutes. Next, the structural members were subjected to hot-isostatic pressing at 1750° C. under a pressure of 2000 bars in an argon atmosphere. The gas-tight envelope was subsequently removed by sand-blasting.

EXAMPLE 2

The starting material to be compacted comprised turbine blades made of porous reaction-sintered silicon nitride containing from 4% to 0%, by weight, of a magnesium oxide as a compacting aid. The total porosity thereof was about 20%.

To apply the first encapsulating layer containing no compacting aid, there was employed the same procedure as in Example 1.

Then, the structural members so treated, were immersed in a second suspension, the solids proportion of which comprised 85%, by weight, of silicon nitride, 12%, by weight, of magnesium oxide and 3%, by weight, of aluminum oxide. The drying procedure was accomplished as in Example 1.

To prepare a gas-tight outer layer the structural members were then sintered at 1800° C. under a nitrogen atmosphere for 20 minutes. The hot-isostatic pressing was then carried out as in Example 1, and so was the removal of the gas-tight envelope after the compacting step.

EXAMPLE 3

The starting material to be compacted comprised turbo-supercharger rotors made by injection molding of silicon nitride powder containing from 4% to 0%, by weight, of yttrium oxide as a compacting aid. The total porosity thereof was about 40%. To apply the first encapsulating layer, the same procedure was employed as in Example 1.

Then, the structural members coated with the first layer were immersed in a second suspension, the solids proportion of which comprised 80%, by weight, of silicon nitride, 15%, by weight, of yttrium oxide and 5%, by weight, of aluminum oxide. Due to the higher proportion of pores and the larger pore size of the starting material to be compacted, it was necessary to repeat the immersion step three more times. Between the individual immersions, an intense drying procedure was carried out to prevent cracking of the applied layers.

To prepare a gas-tight outer layer, the structural members were then sintered as in Example 1 at 1820° C. under a nitrogen atmosphere for 10 minutes. The hot-isostatic pressing and removal of the envelope by sand-blasting were carried out as in the previous Examples by sand-blasting.

EXAMPLE 4

The starting material to be compacted comprised turbo-supercharger rotors made by injection molding of silicon nitride powder containing from 4% to 0%, by weight, of magnesium oxide as a compacting aid. The total porosity thereof was about 40%.

To apply the first encapsulating layer, the same procedure as in Example 1 was employed.

Then, the structural members were immersed in a second suspension, the solids proportion of which comprised 80%, by weight, of silicon nitride, 12%, by weight, of magnesium oxide and 3%, by weight, of aluminum oxide as in Example 2. The immersion procedure was also repeated three times with respective drying procedures therebetween, as in Example 3.

Sintering of the outer layer was carried out as in Example 2 at 1800° C. The subsequent hot-isostatic pressing and removal of the gas-tight envelope by sand-blasting were carried out as in the previous Examples.

EXAMPLE 5

The starting material to be compacted comprised turbine blades made of injection molded silicon carbide powder containing 2%, by weight, of carbon and 2%, by weight, of boron. The total porosity thereof was about 40%. To apply the first encapsulating layer, the structural members were immersed in a suspension comprising 50%, by weight, of silicon carbide powder and 50%, by weight, of isopropyl alcohol. The silicon carbide powder of this first suspension did not contain any sintering aid. Due to the suction effect caused by the porous molded articles upon immersion in the powder suspension, a silicone carbide powder layer about 1 mm in thickness was formed on the surface of the molded bodies. Then, the alcohol was removed by heating at 110° C. in a drying chamber.

Then, the structural members coated with the first layer were immersed in a second suspension, the solids proportion of which comprised 94%, by weight, of silicon carbide, 3%, by weight, of boron and 3%, by weight, of carbon. The immersion step was repeated three times as in Example 4 in order to obtain a layer sufficient in thickness. The reason for the threefold repetition of the immersion step was the high porosity of the green compact and the large pores associated therewith.

To prepare a gas-tight outer layer, the structural members were then sintered at 2100° C. for 30 minutes. Then the structural members were subjected to hot-isostatic pressing at 2050° C. under a pressure of 2000 bars in an argon atmosphere.

The gas-tight envelope was subsequently removed by sand-blasting.

What is claimed is:

1. A process for compacting a structural member having a complicated shape and an optional size and which is made of porous ceramic material by encapsulation of said member with porous ceramic material of the same type and which is capable of being sintered and subsequently subjected to hot-isostatic pressing, comprising the steps of:

(a) immersing a preformed porous ceramic body in a suspension of a porous ceramic material of the same type and which has substantially the same coefficient of thermal expansion as said preformed porous ceramic body in a solvent and which contains no sintering aid, and forming a first encapsulating layer on said body;

(b) evaporating the solvent;

(c) immersing the thus obtained body in a second suspension of a porous ceramic material of the same type and which has substantially the same coefficient of thermal expansion as said preformed porous ceramic body in a solvent and which is capable of being sintered and which contains at least one sintering aid, and forming a second encapsulating layer on said body;

(d) evaporating the solvent;

(e) subjecting the thus obtained body to an elevated temperature in an atmosphere of a protective gas for a sufficient period of time to sinter said body substantially completely;

(f) isostatically compacting said body provided with a tight-sintered surface at pressures in a range of from about 10 MPa to about 300 MPa and temperatures in a range of from about 1600° C. to about 2300° C.;

(g) mechanically removing the two encapsulating layers.

2. A process according to claim 1, wherein the preformed, porous ceramic body is made of non-oxide ceramic material.

3. A process according to claim 1 wherein the preformed, porous ceramic body is made of silicon nitride.

4. A process according to claim 1 wherein the preformed, porous ceramic body is made of silicon carbide.

5. A process according to claim 1 wherein the preformed, porous ceramic body is made of boron nitride.

6. A process according to claim 1 wherein the preformed, porous ceramic body is made of boron carbide.

7. A process according to claim 1 wherein a suspension consisting of from about 30 to about 70% by weight of a powder of porous ceramic material of the same type as the porous ceramic material of which the structural member is made but containing no sintering aid, and from about 70 to about 30% by weight of a solvent, is employed to form the first encapsulating layer.

8. A process according to claim 1 wherein the same porous ceramic material of which the porous ceramic structural member consists is employed in the form of a powder as the solid material to form the first encapsulating layer.

9. A process according to claim 1 wherein the solvent is a readily volatile organic solvent.

10. A process according to claim 1 wherein the solvent is isopropanol.

11. A process according to claim 1 wherein the solvent is evaporated at an elevated temperature in a drying chamber.

12. A process according to claim 1 wherein the solvent is evaporated in a stream of hot air.

13. A process according to claim 1 wherein the solvent is evaporated by allowing the molded article coated with a first encapsulating layer to be exposed to air at room temperature.

14. A process according to claim 1 wherein the first encapsulating layer while still wet is coated with a powdery material capable of sintering and the particle size of which is in excess of the particle size of the first encapsulating layer.

15. A process according to claim 14 wherein the materials employed for the first encapsulating layer and the powdery material are the same but have different particle sizes.

16. A process according to claim 1 wherein a suspension consisting of from about 30 to about 70% by weight of a solid proportion of porous ceramic material and from about 70 to about 30% by weight of a solvent proportion is employed to form the second encapsulating layer.

17. A process according to claim 16 wherein the ratio of the solid proportion to the solvent proportion in the suspension employed to form the second encapsulating layer is adjusted to a ratio by weight of 1:1.

18. A process according to claim 16 wherein the solid proportion of the suspension consists of from about 50 to 99% by weight of a powdery porous ceramic material capable of sintering and from about 1 to 50% by weight of at least one sintering aid.

19. A process according to claim 1 wherein the same material of which the preform and the first encapsulating layer consists is employed as the solid material capable of sintering on the material to form the second encapsulating layer.

20. A process according to claim 1 wherein the solvent employed in the formation of the second encapsulating layer is evaporated in a stream of hot air.

21. A process according to claim 1 wherein the solvent employed in the formation of the second encapsulating layer is evaporated under vacuum and at increased temperature in a pressure oven which is employed for the subsequent steps of sintering and hot-isostatic pressing.

22. A process according to claim 1 wherein the steps of applying a second encapsulating layer containing at least one sintering aid to the preformed porous ceramic body and the subsequent drying of said body are repeated, optionally, several times.

23. A processing according to claim 1 wherein nitrogen is employed as the protective gas in the sintering procedure.

24. A process according to claim 1 wherein the sintering procedure is carried out for a period of about 10 minutes.

25. A process according to claim 1 wherein the two encapsulsating layers are mechanically removed by sand-blasting.

* * * * *